US012732705B2

(12) United States Patent
Gao et al.

(10) Patent No.: US 12,732,705 B2
(45) Date of Patent: Sep. 8, 2026

(54) COMPUTATIONAL PHOTOGRAPHY UNDER LOW-LIGHT CONDITIONS

(71) Applicant: Google LLC, Mountain View, CA (US)

(72) Inventors: Jinglun Gao, San Mateo, CA (US); Ruben Manuel Velarde, Chula Vista, CA (US); Szepo Robert Hung, Austin, TX (US)

(73) Assignee: Google LLC, Mountain View, CA (US)

( * ) Notice: Subject to any disclaimer, the term of this patent is extended or adjusted under 35 U.S.C. 154(b) by 167 days.

(21) Appl. No.: 18/293,107

(22) PCT Filed: Jul. 29, 2021

(86) PCT No.: PCT/US2021/043767
§ 371 (c)(1),
(2) Date: Jan. 29, 2024

(87) PCT Pub. No.: WO2023/009128
PCT Pub. Date: Feb. 2, 2023

(65) Prior Publication Data
US 2025/0080856 A1 Mar. 6, 2025

(51) Int. Cl.
*H04N 23/71* (2023.01)
*G06V 10/82* (2022.01)
(Continued)

(52) U.S. Cl.
CPC ............. *H04N 23/71* (2023.01); *H04N 23/64* (2023.01); *H04N 23/65* (2023.01)

(58) Field of Classification Search
CPC ........ H04N 23/71; H04N 23/64; H04N 23/65; H04N 23/74; H04N 23/6812; H04N 23/80;
(Continued)

(56) References Cited

U.S. PATENT DOCUMENTS

| | | | |
|---|---|---|---|
| 10,051,182 | B2 | 8/2018 | Pulli et al. |
| 2010/0165178 | A1 | 7/2010 | Chou et al. |

(Continued)

FOREIGN PATENT DOCUMENTS

| | | | |
|---|---|---|---|
| CN | 106060406 | A | 10/2016 |
| CN | 106817540 | A | 6/2017 |

(Continued)

OTHER PUBLICATIONS

Liba et al., "Handheld Mobile Photography in Very Low Light," ACM Transactions on Graphics, Nov. 2019, 22 pages, vol. 38, No. 6, Article 164 (arXiv:1910.11336v1).

*Primary Examiner* — Ahmed A Berhan
(74) *Attorney, Agent, or Firm* — McDonnell Boehnen Hulbert & Berghoff LLP

(57) ABSTRACT

This document describes techniques and apparatuses for computational photography under low-light conditions for an image-capture device on a mobile computing device. In aspects, described are techniques and apparatuses for an image-capture device to utilize sensor data in determining whether to enable flash photography or capture multiple images of the scene without use of a flash under low-light conditions. In other aspects, an image-capture device may utilize device data in determining whether to enable flash photography or capture multiple images of the scene without use of a flash under low-light conditions. The disclosed techniques and apparatuses may provide improved computational photography under low-light conditions for an image-capture device on a mobile computing device.

20 Claims, 8 Drawing Sheets

(51) Int. Cl.
*H04N 23/60* (2023.01)
*H04N 23/65* (2023.01)

(58) Field of Classification Search
CPC ...... H04N 23/45; H04N 23/56; H04N 23/951; H04N 23/57; H04N 23/651; G06T 1/0007; G06N 3/044; G06N 3/088; G06N 3/0464; G06N 3/09; G06V 10/803; G06V 10/82
See application file for complete search history.

(56) References Cited

U.S. PATENT DOCUMENTS

| | | | | |
|---|---|---|---|---|
| 2015/0156307 | A1* | 6/2015 | Kim | H04W 52/0251 455/566 |
| 2016/0261781 | A1* | 9/2016 | Chen | H04N 23/74 |
| 2017/0142312 | A1 | 5/2017 | Dal Mutto et al. | |
| 2020/0267299 | A1 | 8/2020 | Le et al. | |
| 2022/0294992 | A1* | 9/2022 | Manzari | H04N 23/632 |

FOREIGN PATENT DOCUMENTS

| | | | |
|---|---|---|---|
| CN | 111901480 | A | 11/2020 |
| CN | 108737728 | B | 6/2021 |
| EP | 3736676 | B1 | 7/2023 |
| JP | 2008092005 | A | 4/2008 |
| JP | 2017139560 | A | 8/2017 |
| JP | 2021040300 | A | 3/2021 |
| KR | 20200019728 | A | 2/2020 |
| KR | 102192093 | B1 | 12/2020 |
| TW | 202034228 | A | 9/2020 |
| TW | 202038184 | A | 10/2020 |
| WO | 2020227386 | A2 | 11/2020 |

* cited by examiner

COMPUTATIONAL PHOTOGRAPHY UNDER LOW-LIGHT CONDITIONS

This application is a national stage application under 35 U.S.C. § 371 of International Application No. PCT/US2021/043767, filed Jul. 29, 2021, the disclosure of which is explicitly incorporated by reference herein in its entirety.

BACKGROUND

Mobile computing devices often include image-capture devices, such as cameras, to capture an image of a scene. There are numerous challenges with conventional image-capture devices operating under low-light conditions. For example, some image-capture devices produce a poor-quality image of a scene under low-light conditions. Some solutions, such as flash photography, may be used to improve image quality in a single aspect, but these solutions often create additional image-quality problems.

This background description is provided for the purpose of generally presenting the context of the disclosure. Unless otherwise indicated herein, material described in this section is neither expressly nor impliedly admitted as being prior art to the present disclosure or the appended claims.

SUMMARY

This document describes techniques and apparatuses for computational photography under low-light conditions. The techniques and apparatuses utilize a mobile computing device with image-capture devices and sensors to receive sensor data. Based on the sensor data, the techniques select to capture multiple images of a scene without use of a flash and then generate a post-computational image based on the multiple captured images.

In aspects, a method for computational photography under low-light conditions is disclosed that includes a mobile computing device receiving sensor data concerning ambient conditions of a scene during low-light conditions for the scene. The mobile computing device selects to capture multiple images of the scene without use of a flash based on the received sensor data concerning the ambient conditions of the scene. One or more image-capture devices of the mobile computing device may be used to capture the scene. The mobile computing device generates and provides the post-computational image.

In other aspects, systems, computer-readable media, and means for performing a method for computational photography under low-light conditions are disclosed.

This Summary is provided to introduce simplified concepts of techniques and apparatuses for computational photography under low-light conditions, the concepts of which are further described below in the Detailed Description and Drawings.

BRIEF DESCRIPTION OF THE DRAWINGS

The details of one or more aspects of computational photography under low-light conditions are described below. The use of the same reference numbers in different instances in the description and the figures indicate similar elements.

While features and concepts of the described techniques and apparatuses for computational photography under low-light conditions can be implemented in any number of different environments, aspects are described in the context of the following examples.

DETAILED DESCRIPTION

Overview

This document describes techniques and apparatuses for computational photography under low-light conditions for an image-capture device. Computational photography under low-light conditions automatically determines whether to capture multiple images under different settings without flash from which a single post-computational image of higher quality may be generated. The automated determination balances multiple factors, such as mobile computing device power constraints and image quality, in making the determination for the user of the mobile computing device, thereby aiding inexperienced users of the mobile computing device and saving time spent manually adjusting settings for experienced users of the mobile computing device.

The computational photography under low-light conditions described herein may utilize sensor data or device data, which allows a mobile computing device to select whether to perform computational photography. Based on the sensor data or device data, the mobile device selects to capture multiple images of the scene without use of a flash, generates a post-computational image, and provides the post-computational image.

Users of mobile computing devices often struggle to take photos under low-light conditions. These users may attempt to manually adjust flash settings, as well as other image-quality settings, on their mobile computing devices in hopes of capturing a high-quality image. However, even expert photographers struggle to calibrate the variables of their cameras properly under low-light conditions to generate a high-quality image. Low-light conditions are particularly challenging due to the choice a photographer must make in deciding whether to manually engage flash or take multiple images without flash and combine them into a single image through a post-computational photography method. The described techniques for computational photography under low-light conditions can solve the photographer's problem by making this decision, as well as save computing resources, such as processing resources or battery power. To do so, the techniques analyze multiple factors as part of an automated decision rather than require a user either to manually adjust settings on an image capture device in a trial-by-error approach or to capture an image of lower quality than would be captured using the techniques.

While features and concepts of the described techniques and apparatuses for computational photography under low-light conditions for an image-capture device can be implemented in any number of different environments, aspects are described in the context of the following examples.

Example Devices

Figure 1:
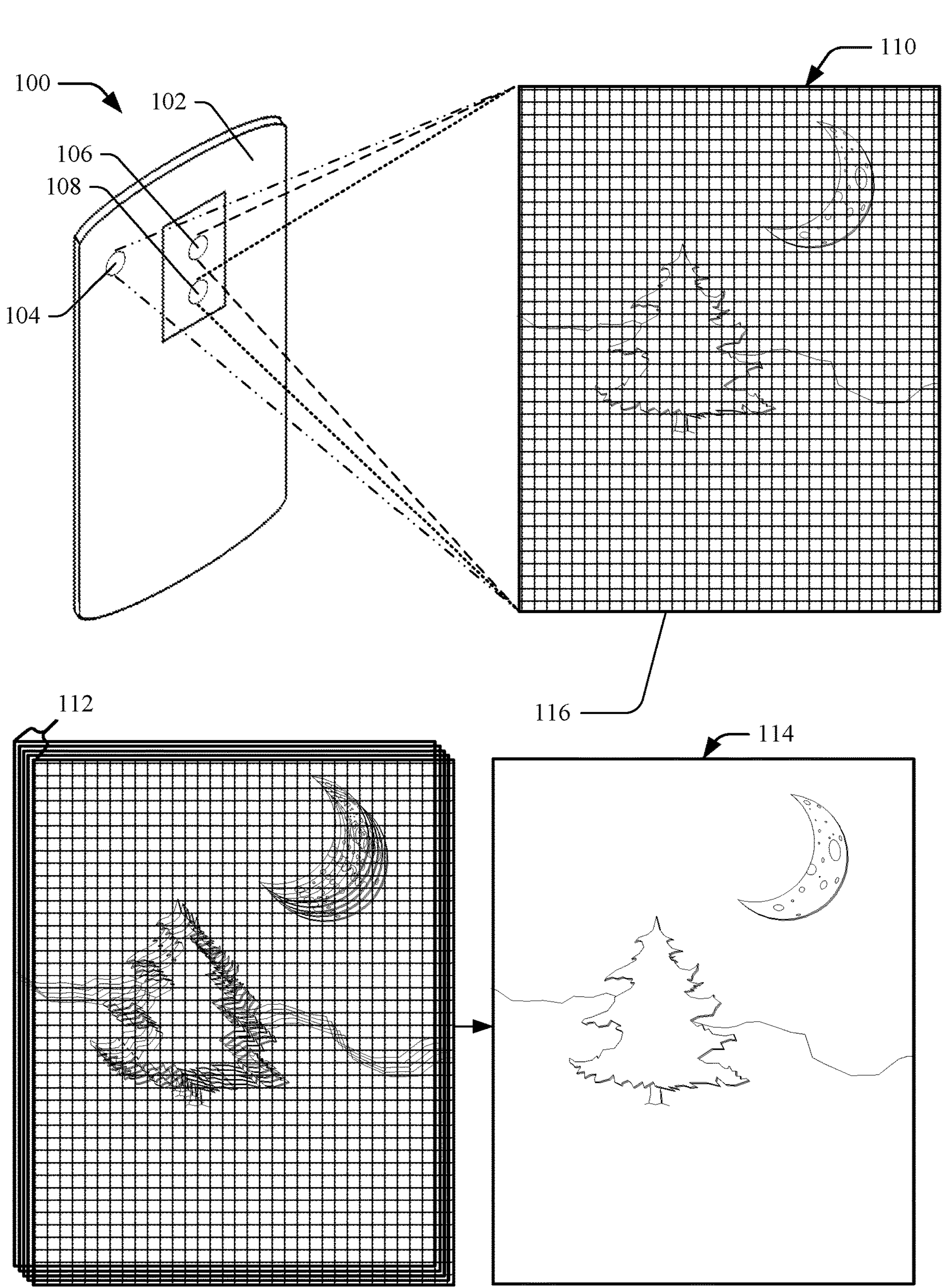
FIG. 1 illustrates an example implementation of a mobile computing device performing computational photography under low-light conditions.

FIG. 1 illustrates an example implementation 100 of a mobile computing device 102 that performs computational photography under low-light conditions in accordance with the techniques described herein. The mobile computing device 102 illustrated may include one or more sensors 104, a first image-capture device 106, and a second image-capture device 108. As illustrated, the mobile computing device 102 is used to capture a scene 110. The scene 110 may be captured by one or more image-capture devices (e.g., the first image-capture device 106 and the second image-capture device 108), which may capture one or more images 112 of the scene 110 in order to generate a post-computational image 114 of higher quality. In other words, the mobile computing device 102 captures multiple images 112 of a scene 110 and those individual images have varying levels of quality. For example, one image may have a high level of object reflectivity while another image may have a distortion from object movement within the scene. The mobile computing device 102 can process those multiple images 112 in a manner to select for the most desirable quality (e.g., optimal scene brightness, optimal object motion, optimal scene type, optimal object range, and optimal object reflectiveness) while removing undesirable traits (e.g., scene distortion, glare, washed-out look). Once selected through the process, the mobile computing device 102 produces a single post-computational image 114 of higher quality than each of the multiple images 112 alone.

The mobile computing device 102 contains one or more sensors 104 to capture sensor data, which may be used to determine conditions in the scene 110 to be captured. For example, the sensor data may include scene-type data by which to determine a type of scene for which an image is intended to be captured. This scene-type data can be received from a spectral sensor integrated with the mobile computing device 102, for example. This and other sensor data are used by the techniques to determine whether or not to capture images with a flash.

The sensors 104 may include an ambient light sensor that indicates a level of ambient light in each scene. The level of ambient light may help with the determination of the existence of the low-light condition 116, as well as how little light is ambient in the scene. Low-light conditions 116 may apply to many different environments including, but not limited to: fog, rain, smoke, snow, being indoors, at night, and so forth. The low-light conditions 116 may also apply to many different times of day, including dusk and dawn. For example, the scene occurs outdoors after sunset as natural light fades from a scene. In another example, the scene occurs indoors with a low amount of interior lighting.

In another aspect, selecting to capture multiple images 112 of the scene 110 without use of a flash is based on the received sensor data concerning the conditions of the scene and using one or more image-capture devices (e.g., the first image-capture device 106 and the second image-capture device 108) of the mobile computing device 102. This determination can be made using a decision tree, a weighted-sum equation, or a machine-learning model based on the captured sensor data.

In yet another aspect, selecting to capture multiple images 112 of the scene 110 without use of a flash is based on device data, as noted above, concerning power consumption on the mobile computing device 102 or sensor data.

In the example implementation 100, two image-capture devices (e.g., a first image-capture device 106 and a second image-capture device 108) capture one or more images 112 of the scene 110 to be captured. In addition, a sensor 104 may collect sensor data regarding the scene (e.g., scene brightness, object motion, scene type, object range, and object reflectiveness). The two image-capture devices (e.g., a first image-capture device 106 and a second image-capture device 108) and the sensor 104 collect data stored on the mobile computing device 102 (e.g., brightness data, object motion data, scene type data, object range data, and object reflectiveness data).

In one aspect, selecting to capture multiple images 112 of the scene 110 without flash may be determined, at least partially, through machine learning based on a human-selected preference or non-human-selected preference for the quality of a post-computational image 114. In other aspects, selecting to capture the multiple images 112 of the scene 110 without use of the flash performs machine learning based on sensor data concerning ambient conditions of the scene 110, the low-light condition 116 for the scene 110, and a machine-learned expectation of an image quality of the post-computational image or an image quality captured using the flash. For example, the machine-learned expectation of an image quality is based on a user of the mobile computing device 102 choosing to delete an image after the image was captured. In another example, the machine-learned expectation of an image quality is based on an analysis of the image, such as individual pixel values. The pixel values offer insight into whether an image is "washed-out" or highly reflective, thereby indicating poor image quality and suggesting, through the machine-learned model, an alternative setting for computational photography.

While not required, the techniques may use a machine-learning model that is trained using previous image captures made by the user or other users. For example, the use of machine learning may include supervised or unsupervised learning through use of neural networks, including perceptron, feedforward neural networks, convolutional neural networks, radial basis function neural networks, or recurrent neural networks. A likelihood of exposure-related defects using flash or not using flash can also be determined through supervised machine learning. In supervised machine learning, a labeled set of previous image captures identifying features associated with the image can be given to build the machine-learning model, such as non-imaging data (e.g., accelerometer data, flicker sensor data, gyroscope data, radar data) and imaging data, labeled based on their impact on an image captured during low-light conditions 116 (e.g., a blur defect, a high-noise defect, or a banding defect). Through this supervised machine learning, future image captures may be classified by their exposure-related defect based on relevant features. Further, the future image captures may be fed back into the data set to further train the machine-learning model. The machine-learning model may automatically determine whether to capture a single image using flash or capture multiple images under different settings without flash from which a single post-computational image of higher quality is generated, thereby aiding inexperienced users of the mobile computing device 102 and saving time spent manually adjusting settings for experienced users of the mobile computing device 102.

Figure 2:
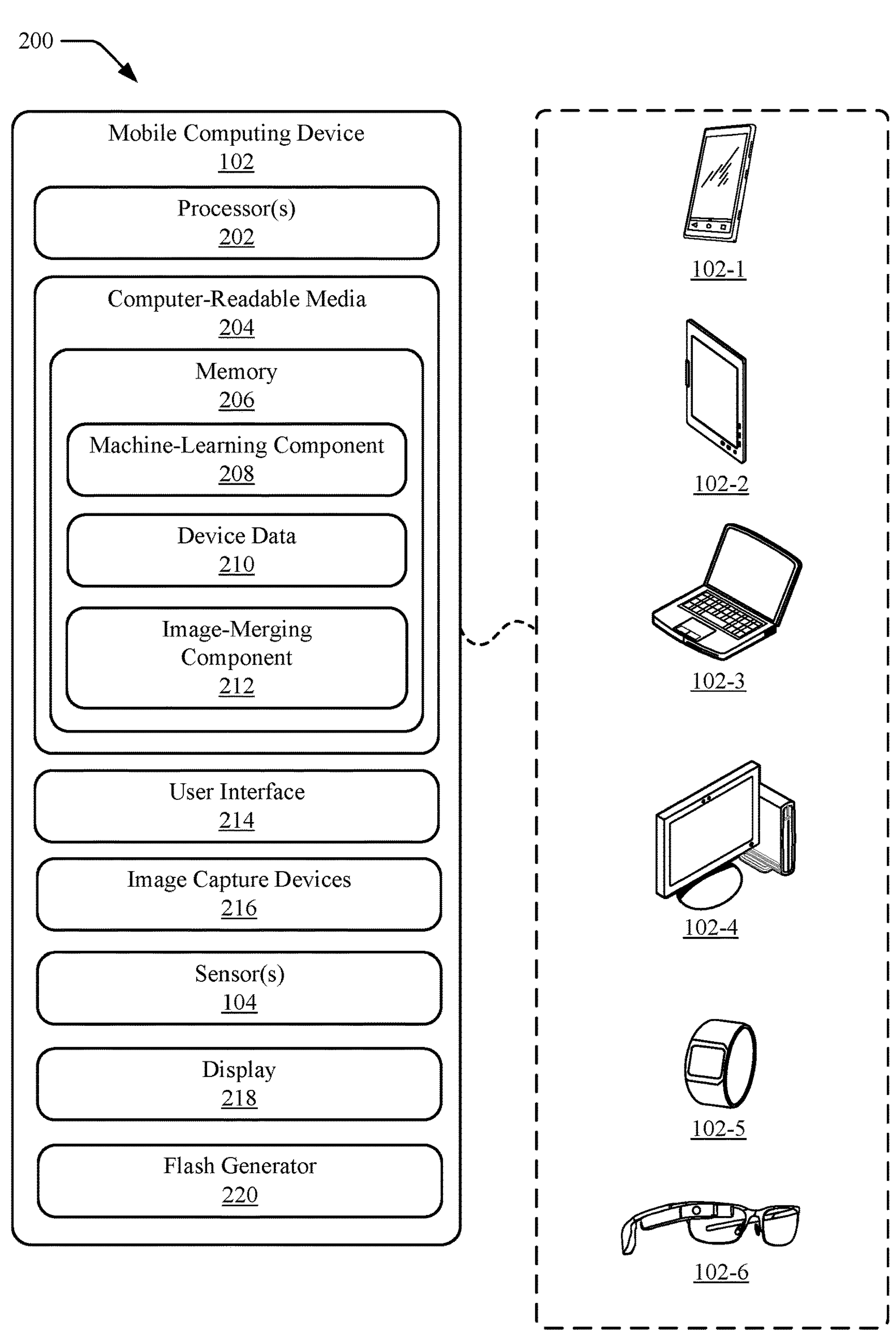
FIG. 2 illustrates an example operating environment in which computational photography under low-light conditions may be implemented.

FIG. 2 illustrates an example operating environment 200 in which computational photography under low-light conditions 116 for a user device 102 may be implemented. While this document discloses certain aspects of computational photography under low-light conditions 116 for an image-capture device (e.g., the first image-capture device 106 and the second image-capture device 108) performed on a mobile computing device 102 (e.g., smartphone), it should be noted that computational photography under low-light conditions 116 for an image-capture device may be performed using any computing device, including but not limited to: a mobile computing device 102-1; a tablet 102-2; a laptop or personal computer 102-3; a television 102-4; a watch 102-5; imaging eyewear 102-6; and the like.

The example operating environment 200 illustrated in FIG. 2 includes one or more processors 202, computer-readable media 204 containing memory 206, which may incorporate a machine-learning component 208, device data 210, or image-merging component 212 that, when executed by the one or more processors 202, cause the one or more processors 202 to implement the method of computational photography under low-light conditions as described in this document. The example operating environment 200 also includes a user interface 214, one or more image-capture devices 216 (e.g., the first image-capture device 106 and the second image-capture device 108), one or more sensors 104 capable of capturing sensor data, a display 218, and a flash generator 220. Multiple captured images 112 of the scene 110 under low-light conditions 116 are utilized by the image-merging component 212 to implement the method of computational photography under low-light conditions. Each of the multiple captured images 112 of the scene 110 under low-light conditions 116 can be captured with a different exposure setting or lighting setting (e.g., exposure stacking), and the image-merging component 212 combines the multiple captured images 112 into a single post-computational image 114 of higher quality.

Figures 3A, 3B:
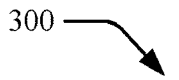
FIGS. 3A and 3B illustrate examples of sensors and data used in performing computational photography under low-light conditions.

FIG. 3A illustrates examples of the sensor(s) 104 that can be used to collect sensor data. For example, the mobile computing device 102 may contain non-imaging sensors 302 capable of producing non-imaging data and imaging sensors 304 capable of producing imaging data in addition to other types of data. The non-imaging sensors 302 include an accelerometer 306, a flicker sensor 308, a gyroscope 310, and a radar system 312. The accelerometer 306 and gyroscope 310 may be capable of determining movement in the scene 110 to be captured resulting from movement of the mobile computing device 102. In other words, if movement exists and the mobile computing device lacks stability, then there may be a higher or lower likelihood that computational photography under low-light conditions 116 will be preferred over flash photography. In other aspects, the flicker sensor 308 may measure rapid changes in brightness. If brightness is highly variable, then computational photography for multiple images 112 may be preferred over flash photography of a single image. In additional aspects, the radar system 312 is capable of determining movement in a scene to be captured may be implemented with the mobile computing device 102. In still additional aspects, any other sensor capable of providing sensor data to determine the likelihood of implementing computational photography under low-light conditions 116 may be utilized.

The sensor data may be imaging data captured by imaging sensors 304, including the one or more image-capture devices (e.g., the first image-capture device 106 and the second image-capture device 108) of the mobile computing device 102. The imaging sensors 304 of the image-capture devices include Complementary Metal-Oxide-Semiconductor (CMOS) Sensors 314 or the like. For example, CMOS sensors 314 may provide data indicating object reflectivity of the scene 110. In the event of high object reflectivity, performing computational photography under low-light conditions 116 with multiple images 112 may be preferred over flash photography for capture of a single image.

FIG. 3B illustrates examples of device data 210 that can be used for computational photography under low-light conditions. Examples include power consumption associated with generation of a flash 316, power consumption associated with adjustment of a shutter of the one or more image-capture devices 318, power consumption associated with adjustment of a lens of the one or more image-capture devices 320, and power consumption associated with capturing multiple images and post-processing those images 322. For example, the techniques can determine and balance the power consumption costs of each of the device data 210, such as determining that performing a flash will cost more power than capturing more than a single image with the flash and then post-processing those images (e.g., comparing 316 with 322).

Figure 4:
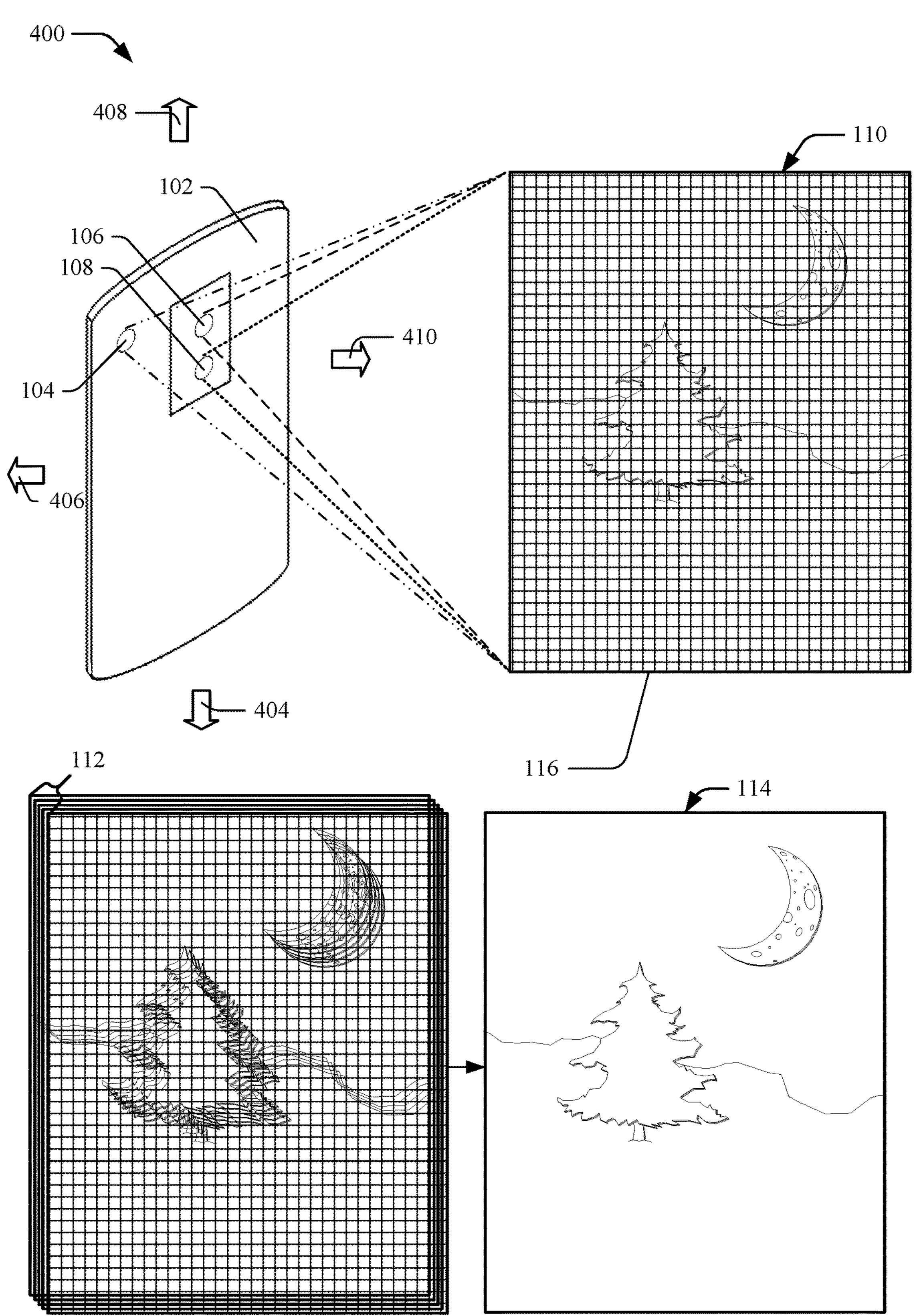
FIG. 4 illustrates examples of non-imaging data used for performing computational photography under low-light conditions.

FIG. 4 illustrates an example 400 of a mobile computing device 102 performing computational photography under low-light conditions 116 based on non-imaging data 402 (shown received through the sensor 104). In one example, non-imaging data is provided by an accelerometer 306 or gyroscope 310 (not shown) capable of determining movement in the scene to be captured due to movement of the mobile computing device 102. The movement of the mobile computing device 102 is demonstrated with arrows 404, 406, 408, and 410, respectively. The data collected from the accelerometer 306 or gyroscope 310 indicates whether the image-capture device (e.g., the first image-capture device 106 and the second image-capture device 108) maintains stability necessary for selecting to capture multiple images 112 of the scene 110 without use of a flash 412 and provide a post-computational image 114 of higher quality than a flash image. When the image-capture devices 106 and 108 are accelerating (e.g., jerking, having rapid movement changes), greater weight can be given to performing a flash rather than performing multiple image captures for processing into a single image.

Figure 5:
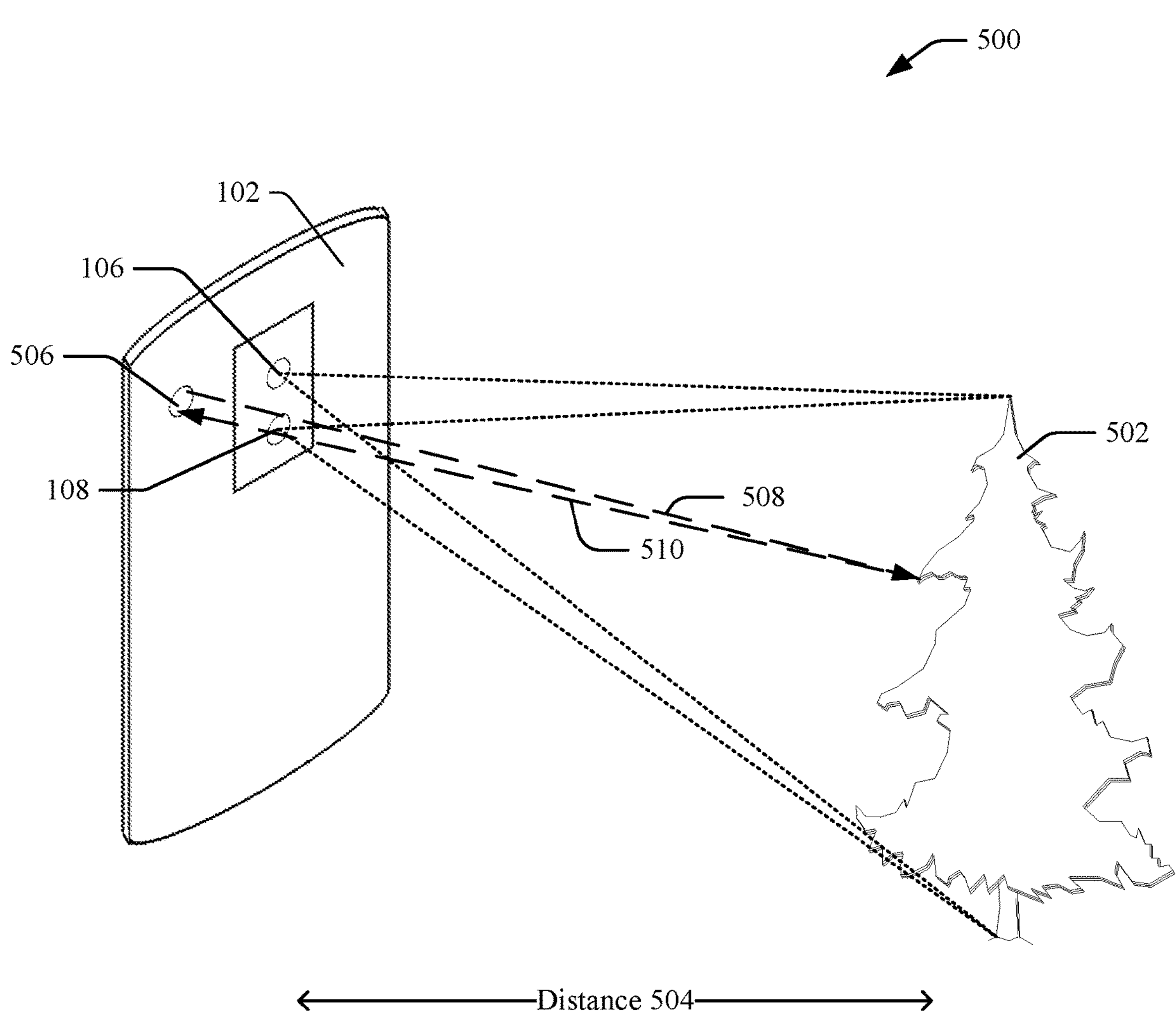
FIG. 5 illustrates an example implementation of a mobile computing device gathering distance data for performing computational photography under low-light conditions.

FIG. 5 illustrates an environment 500 in which a distance (e.g., distance data) is calculated from the mobile computing device 102 to an object 502. Selecting to capture multiple images 112 of a scene 110 may be based, in part, on distance 504. Here the mobile computing device 102 uses a laser sensor 506 to determine the distance 504, though other sensors can be used, such as based on data from the first image-capture device 106 and the second image-capture device 108.

In more detail, the laser sensor 506, integrated with the mobile computing device 102, can emit an infrared light 508 onto the object 502 in the scene and then receive the infrared light that has been reflected 510 from the object 502. The mobile computing device 102 then calculates the distance 504 based on a time difference between emitting and receiving the infrared light.

Figure 6:
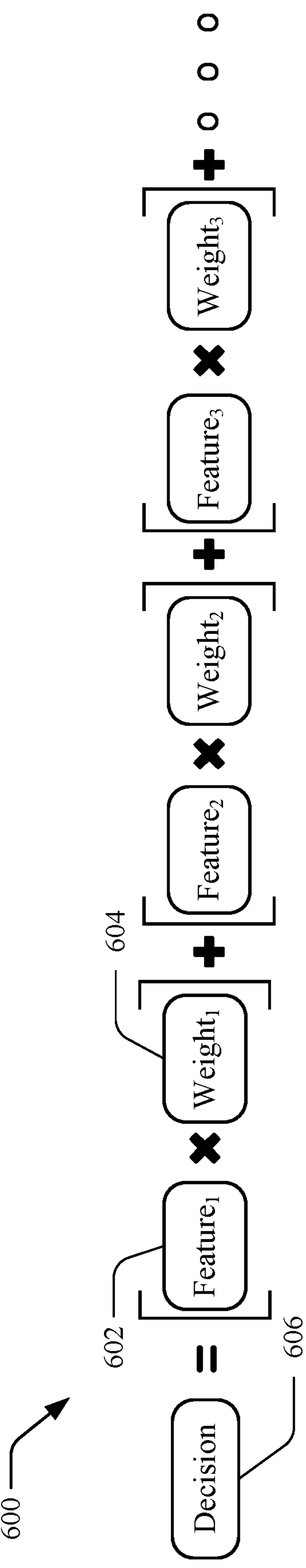
FIG. 6 illustrates an example weighted-sum equation for computational photography under low-light conditions.
Figure 6:

FIG. 6 illustrates an example weighted-sum equation 600 utilized in computational photography under low-light conditions 116 for an image-capture device (e.g., a first image-capture device 106 and a second image-capture device 108). The weighted-sum equation 600 includes a feature value 602 multiplied by a weight value 604 added to other weighted values multiplied by their corresponding feature values.

When a final sum (decision 606) exceeds a threshold, the techniques select to capture multiple images 112 of the scene 110 without use of the flash.

In additional aspects, each of the feature values 602 can include sensor data such as scene brightness, object motion, scene type, distance data, or object reflectivity (shown with multiple other features and weights at 600). In other aspects, each of the feature values 602 can include device data such as power consumption required to generate a flash, adjust a shutter, adjust a lens of the one or more image-capture devices, or capture multiple images and perform post-processing on those images.

For example, power consumption associated with generation of a flash 316 on a mobile computing device 102 operating with low power may favor performing computational photography under low-light conditions 116 with multiple images 112 over flash photography of a single image. In another example, power consumption associated with adjustment of a shutter of the one or more image-capture devices 318 on a mobile computing device 102 operating with low power may favor performing computational photography under low-light conditions 116 with multiple images 112 over flash photography of a single image. In yet another example, power consumption associated with adjustment of a lens of the one or more image-capture devices 320 on a mobile computing device 102 operating with low power may favor performing computational photography under low-light conditions 116 with multiple images 112 over flash photography of a single image. In still another example, power consumption associated with generating a post-computational image 114 of the one or more image-capture devices on a mobile computing device 102 operating with low power may disfavor performing computational photography under low-light conditions 116 with multiple images 112 over flash photography of a single image.

Figure 7:
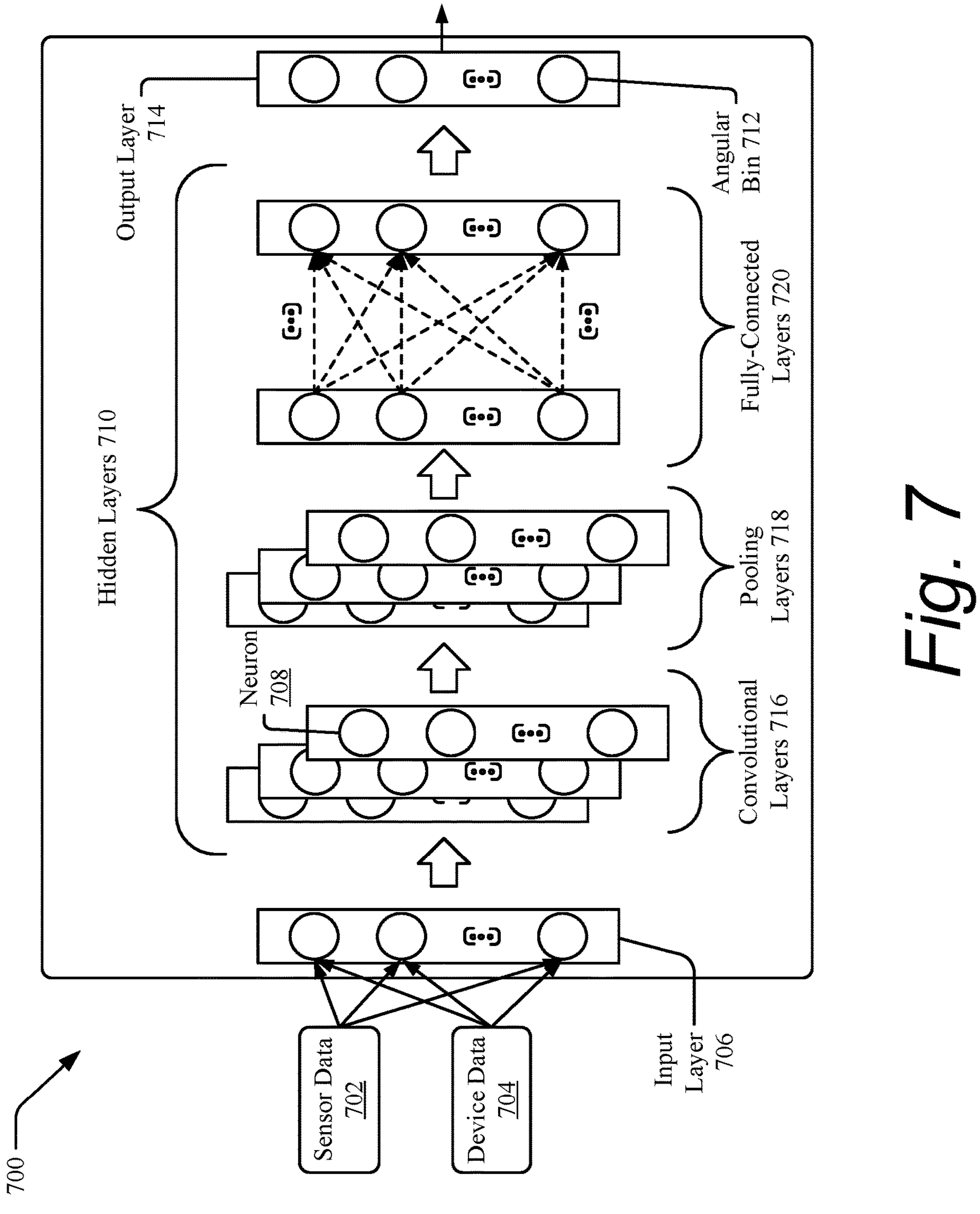
FIG. 7 illustrates an example machine-learning model for computational photography under low-light conditions.

FIG. 7 illustrates an example convolutional neural network 700 for performing computational photography under low-light conditions 116 using machine learning. In the depicted configuration, the convolutional neural network 700 implements computational photography under low-light conditions 116. The general operation of the convolutional neural network 700 includes receiving sensor data 702 or device data 704 provided as an input layer 706 to neurons 708 within hidden layers 710. Probabilities for different angular bins 712 are generated at the output layer 714.

In aspects, selecting to capture the multiple images 112 of the scene 110 without use of the flash utilizes training data including sensor data 702 (e.g., scene brightness, object motion, scene type, distance data, or object reflectivity) concerning ambient conditions, low-light conditions 116, and a human-selected or non-human-selected preference for a non-flash captured image or a flash-captured image. For example, a human user of the mobile computing device 102 may delete a photo from the mobile computing device 102 taken with flash due to the user's decision that the image was poor quality. In another example, a non-human (e.g. software) with access to data on the mobile computing device 102 may analyze and determine that a photo from the mobile computing device 102 taken with or without a flash is of low quality, such as through poor clarity, resolution, white balance, color, or other measures of image quality. These determinations of image quality can be used to build or improve a machine-learning model, such as the convolutional neural network 700.

In particular, the hidden layers 710 include convolutional layers 716, pooling layers 718, and fully connected layers 720. In aspects, the convolutional layers 716 include a first convolutional layer having geometric shapes identified by pixel values. The pixel values may originate from a prior-captured image (e.g., a post-computational image of a prior scene) in addition to other provided sensor data of a prior-captured image (e.g., accelerometer, flicker sensor, gyroscope). In one example, a filter may be applied to the sensor data 702 to select for geometric shapes (e.g., square, circle, line, ellipse). In additional aspects, the convolutional layers 716 may include a second convolutional layer, including scene elements determined based on the geometric shape classifications within the first convolutional layer. For example, the first convolutional layer may include geometric shapes identifying two circles above a horizontal line. The second convolutional layer may classify the two circles above a horizontal line as a human face. In another example, the second convolutional layer may include elements from the scene 110, such as a moon, tree, or cliff edge. In yet another example, the second convolutional layer may identify scene elements such as a facial feature, a distance between objects, a stadium, or a mountain landscape, to name just a few. In still further aspects, the convolutional layers 716 may include a third convolutional layer having data regarding a human-selected or non-human-selected preference to delete a prior post-computational image captured for a prior scene. The human-selected preference to delete an image captured for a prior scene may be used to train the machine-learning model. The human may determine that a prior post-computational image or flash image lacks sufficient quality and subsequently delete the image. Alternatively, the machine-learning model can be trained based on a positive human interaction with a prior image, such as selecting to send the image to another device, upload it to social media, store it, and so forth.

The convolutional layers 716 perform a convolution operation on the incoming data using learned filters (e.g., kernels) to extract features of the sensor data 702. The pooling layers 718 aggregate (e.g., combines) outputs of multiple neurons 708 of a previous layer and passes the result to a single neuron of a next layer. The pooling layers 718 can perform a weighted-sum operation or a maximum operation, for instance.

In additional aspects, the training data is sensor data 702 including scene brightness, object motion, scene type, distance data, or object reflectivity and selecting to capture the multiple images 112 of the scene 110 without use of the flash is based on a machine-learned model built using training data that includes the scene brightness, object motion, scene type, distance data, or object reflectivity. Alternatively, the training data includes device data 704, such as data concerning power consumption, including power to perform the machine learning and selecting to capture the multiple images 112 of the scene 110 without use of the flash is based on a machine-learned model built using training data that includes the data concerning power consumption, including power to perform the machine learning. This is but one way in which the techniques may determine not only which image is of higher likely quality, an image captured with a flash or multiple images captured without a flash and then processed into an image, but also, for cases where the confidence of the machine learning is low, or the threshold of the weighted sum is barely or nearly met, to instead select based on power consumption.

Example Methods

Figure 8:
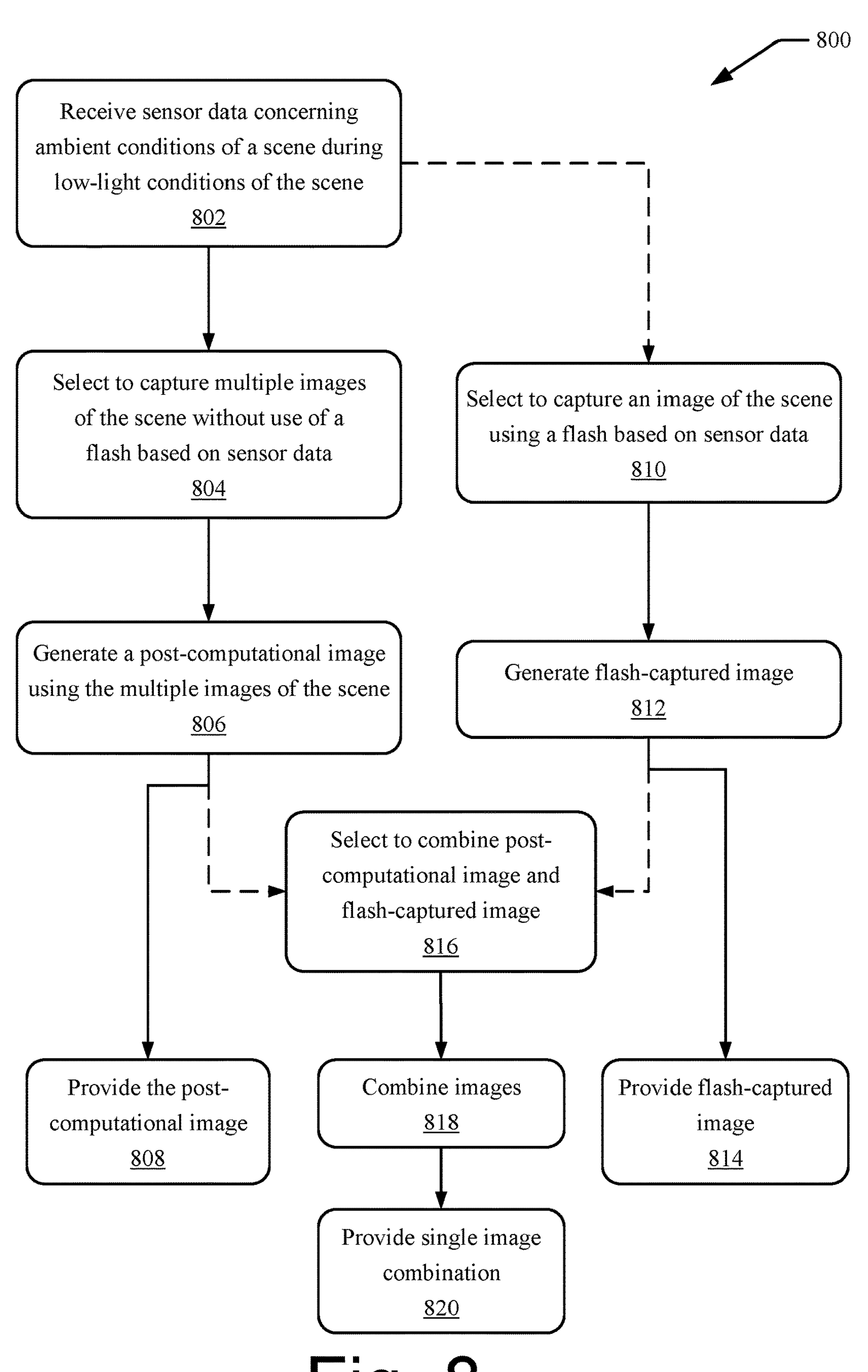
FIG. 8 illustrates an example method for computational photography under low-light conditions.

FIG. 8 illustrates an example method 800 of computational photography under low-light conditions. In this example, the method automatically determines whether to capture a single image using flash or capture multiple images without flash from which a single post-computational image is generated. The automated determination balances multiple factors, such as power constraints of the mobile computing device 102 and image quality, in making the determination. This determination aids users of the mobile computing device 102 to better capture images in low-light conditions.

At 802, and through one or more sensors, a mobile computing device receives sensor data concerning ambient conditions of a scene during low-light conditions of the scene. In one example, the sensor data may include scene-type data and the sensor data is received, at least in part, from a spectral sensor integrated with the mobile computing device 102. In another example, the sensor data can be used to measure, from an object 502 in the scene, a distance 504 to the mobile computing device 102, such as through use of an infrared laser. For example, the techniques can determine the distance 504 from the object 502 in the scene to be captured by measuring a time of emitting, from a laser sensor 506, infrared light 508 onto the object 502 in the scene, and then receive the reflected infrared light that has been reflected 510 from the object 502.

At 804, the mobile computing device selects to capture multiple images of the scene without use of a flash based on the sensor data, such as reflectivity or motion-detection data. For example, the mobile computing device 102 may select to capture multiple images 112 of a scene 110 without use of a flash based on distance data, described in relation to FIG. 5. In another example, the selection is determined through a decision tree, a weighted-sum equation described in relation to FIG. 6, or a combination of these determination manners. In yet another example, the mobile computing device 102 may select to capture multiple images 112 of a scene 110 without use of a flash based on the sensor data when analyzed by machine learning, described in relation to FIG. 7.

At 806, the multiple images of the scene are combined to generate a post-computational image. Example manners for performing post-processing include an image-merging component 212 that, when executed by the one or more processors 202, cause the one or more processors 202 to implement the method of computational photography under low-light conditions as described in this document. Multiple captured images 112 of the scene 110 under low-light conditions 116 are utilized by the image-merging component 212 to implement the method of computational photography under low-light conditions. Each of the multiple captured images 112 of the scene 110 under low-light conditions 116 can be captured with a same or different exposure setting or lighting setting (e.g., exposure stacking), and the image-merging component 212 combines the multiple captured images 112 into a single post-computational image 114 of high quality.

At 808, the post-computational image is provided, such as through display on the mobile computing device 102 or storage thereon.

As noted above, however, the techniques may determine to capture an image using the flash based on the various criteria described above. In such as case, at 810, the mobile computing device selects to capture an image of the scene using a flash, such as by causing the flash generator 220 to provide, in timing with the one or more image capture devices 216, to capture an image of the scene using a flash. At 812, the techniques generate the flash-captured image, which is then provided by the techniques at 814.

In some alternative or additional cases, however, the techniques may select to capture multiple images of the scene without use of the flash and capture an image of the scene with a flash (e.g., capturing non-flash images before and/or after the flash). In such a case, the techniques select either to provide the post-computation image at 808, the flash-captured image at 814, or a post-processed combination of both. In selecting one or the other, the techniques determine which is the better of the two images to provide, though both may be stored or presented for selection by a user.

To combine both, however, at 816 the techniques select to combine portions of the post-computational image and the flash-captured image. The techniques may do so based on some defect in one or both images, such as blur or noise defects, or sensor data indicating that noise or blur is likely (e.g., prior to capture as noted above). One example combination is where portions of a post-computational image taken without a flash are used to reduce noise in those portions, while portions of a flash-captured image that have movement, and thus may otherwise looked blurred due to the motion, are then combined. Thus, at 818 the images are combined and, at 820, a single image having portions of the scene captured with and without a flash is provided.

Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, including, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Some examples are described below:

Example 1: a method comprising: receiving, at a mobile computing device and during a low-light condition for a scene, sensor data concerning ambient conditions of the scene; selecting to capture, based on the received sensor data concerning the ambient conditions of the scene and using one or more image-capture devices of the mobile computing device, multiple images of the scene without use of a flash; responsive to capturing the multiple images of the scene without use of the flash, generating a post-computational image using the multiple images of the scene; and providing the post-computational image.

Example 2: the method as recited by example 1, wherein receiving device data concerning power consumption on the mobile computing device may determine the decision to select to capture multiple images of the scene without use of the flash.

Example 3: the method as recited by example 2, wherein the power consumption includes power to: generate the flash for the one or more image-capture devices; adjust a shutter of the one or more image-capture devices; adjust a lens of the one or more image-capture devices; or generate the post-computational image.

Example 4: the method as recited by example 1, wherein selecting to capture the multiple images of the scene without use of the flash performs machine learning, the machine learning based on the sensor data concerning ambient conditions of the scene, the low-light condition for the scene, and a machine-learned expectation of an image quality of the post-computational image or an image quality captured using the flash.

Example 5: the method as recited by example 4, wherein the machine learning includes device data concerning power consumption, the power consumption including power to perform the machine learning.

Example 6: the method as recited by example 1, wherein selecting to capture the multiple images of the scene without use of the flash performs machine learning, the machine learning utilizing a machine-learning model created using training data comprising sensor data concerning ambient conditions, low-light conditions, and a human-selected preference for a non-flash captured image or a flash-captured image.

Example 7: the method as recited by example 6, wherein the machine-learning model comprises a convoluted neural network, the convoluted neural network having a first convolutional layer comprising geometric shape classifications identified by pixel values.

Example 8: the method as recited by example 7, wherein the convoluted neural network comprises a second convolutional layer, the second convolutional layer comprising scene elements determined based on the geometric shapes classifications within the first convolutional layer.

Example 9: the method as recited by example 8, wherein the second convolutional layer comprises scene elements including: a facial feature; a distance between objects; a stadium; or a mountain landscape.

Example 10: the method as recited by example 8 or 9, wherein the convoluted neural network comprises a third convolutional layer, the third convolutional layer comprising data regarding a human-selected preference to delete a prior post-computational image captured for a prior scene.

Example 11: the method as recited by example 1, wherein selecting to capture the multiple images of the scene without use of the flash performs machine learning, the machine learning utilizing a machine-learning model created using training data comprising sensor data concerning ambient conditions, low-light conditions, and a non-human-selected preference for a non-flash captured image or a flash-captured image.

Example 12: the method as recited by example 1, wherein the sensor data includes brightness data and the sensor data is received, at least in part, from a spectral sensor integrated with the mobile computing device, and wherein selecting to capture multiple images of the scene without use of the flash is based on the brightness data.

Example 13: the method as recited by example 1, wherein the sensor data includes motion-detection data and the sensor data is received, at least in part, from a spectral sensor in a pre-flash setting, and wherein selecting to capture multiple images of the scene without use of the flash is based on the motion-detection data.

Example 14: the method as recited by example 1, wherein the sensor data includes scene-type data and the sensor data is received, at least in part, from a spectral sensor integrated with the mobile computing device and wherein selecting to capture multiple images of the scene without use of the flash is based on the scene-type data.

Example 15: the method as recited by example 1, wherein the sensor data includes distance data and selecting to capture multiple images of the scene without use of the flash is based on the distance data.

Example 16: the method as recited by example 15, wherein the distance data is received, at least in part, from two image-capture devices of the one or more image-capture devices.

Example 17: the method as recited by example 15, wherein the distance data is received, at least in part, from a laser sensor integrated with the mobile computing device, the mobile computing device configured to calculate distance from the one or more image-capture devices to an object in the scene.

Example 18: the method as recited by example 17, wherein the laser sensor casts an infrared light onto the object in the scene and the laser sensor receives the infrared light that has been reflected from the object.

Example 19: the method as recited by example 18, wherein a first time from the laser sensor emitting the infrared light onto an object in the scene and a second time the laser sensor receives the reflected infrared light is multiplied by a speed of the infrared light to provide the distance data.

Example 20: the method as recited by example 1, wherein the sensor data includes object reflectivity data and selecting to capture multiple images of the scene without use of the flash is based on the object reflectivity data.

Example 21: the method as recited by example 1, wherein selecting to capture multiple images of the scene without use of the flash is based on a weighted-sum equation including: an assigned weighted value to two or more of the sensor data, the two or more of the sensor data including scene brightness, object motion, scene type, distance data, or object reflectivity.

Example 22: the method as recited by example 21, wherein the weighted values generate a sum, and the sum must exceed a threshold to enable the selecting to capture multiple images of the scene without use of the flash.

Example 23: the method as recited by example 1, wherein selecting to capture multiple images of the scene without use of the flash is based on a weighted-sum equation, the weighted-sum equation including: an assigned weighted value to two or more device data, the two or more device data including power consumption to: generate a flash for the one or more image-capture devices; adjust a shutter of the one or more image-capture devices; adjust a lens of the one or more image-capture devices; or generate a post-computational image; wherein the weighted values generate a sum, and wherein the selecting to capture multiple images of the scene without use of a flash is based on the sum exceeding a threshold.

Example 24: the method as recited by example 1, wherein the sensor data includes scene brightness, object motion, scene type, distance data, or object reflectivity and selecting to capture the multiple images of the scene without use of the flash is based on a machine-learned model built using training data that includes the scene brightness, object motion, scene type, distance data, or object reflectivity.

Example 25: the method as recited by example 1, wherein the sensor data includes non-imaging data.

Example 26: the method as recited by example 25, wherein the non-imaging data includes data collected from an accelerometer, the data collected from the accelerometer indicating whether the image-capture device maintains stability necessary for selecting to capture multiple images of the scene without use of a flash.

Example 27: the method as recited by example 1, wherein the sensor data is imaging data captured by the one or more image-capture devices of the mobile computing device.

Example 28: a mobile computing device comprising: a processor; one or more sensors, image sensors, or flash generators; and a computer-readable storage medium having stored thereon instructions that, responsive to execution by the processor, cause the processor to execute the method of any of examples 1 to 27.

CONCLUSION

Although aspects of computational photography under low-light conditions for an image-capture device have been described in language specific to features and/or methods, the subject of the appended claims is not necessarily limited to the specific features or methods described. Rather, the specific features and methods are disclosed as example implementations of the claimed computational photography under low-light conditions for an image-capture device, and other equivalent features and methods are intended to be within the scope of the appended claims. Further, various aspects are described, and it is to be appreciated that each described aspect can be implemented independently or in connection with one or more other described aspects.

What is claimed is:

1. A method comprising:

receiving, at a mobile computing device and during a low-light condition for a scene, sensor data concerning ambient conditions of the scene;

determining, based on the received sensor data concerning the ambient conditions of the scene and using one or more image-capture devices of the mobile computing device, whether to (1) capture multiple images of the scene without use of a flash or (2) capture an image of the scene using the flash;

responsive to determining to capture the multiple images of the scene without use of the flash, generating and providing a post-computational image using the multiple images of the scene; and responsive to determining to capture the image of the scene using the flash, generating and providing a flash-captured image.

2. The method of claim 1, wherein the method further comprises receiving device data concerning power consumption on the mobile computing device, and wherein selecting determining whether to capture multiple images of the scene without use of the flash or capture the image of the scene using the flash is further based on the power consumption.

3. The method of claim 2, wherein the power consumption comprises power to:

generate the flash for the one or more image-capture devices;

adjust a shutter of the one or more image-capture devices;

adjust a lens of the one or more image-capture devices; or generate the post-computational image.

4. The method of claim 1, wherein the sensor data comprises brightness data and the sensor data is received, at least in part, from a spectral sensor integrated with the mobile computing device, and wherein determining whether to capture multiple images of the scene without use of the flash or capture the image of the scene using the flash is based on the brightness data.

5. The method of claim 1, wherein the sensor data comprises motion-detection data and the sensor data is received, at least in part, from a spectral sensor in a pre-flash setting, and wherein determining whether to capture multiple images of the scene without use of the flash or capture the image of the scene using the flash is based on the motion-detection data.

6. The method of claim 1, wherein the sensor data comprises scene-type data and the sensor data is received, at least in part, from a spectral sensor integrated with the mobile computing device and wherein determining whether to capture multiple images of the scene without use of the flash or capture the image of the scene using the flash is based on the scene-type data.

7. The method of claim 1, wherein the sensor data comprises distance data and determining whether to capture multiple images of the scene without use of the flash or capture the image of the scene using the flash is based on the distance data.

8. The method of claim 1, wherein the sensor data comprises object reflectivity data and determining whether to capture multiple images of the scene without use of the flash or capture the image of the scene using the flash is based on the object reflectivity data.

9. The method of claim 1, wherein the sensor data further comprises non-imaging data collected from an accelerometer, the data collected from the accelerometer indicating whether the image-capture device maintains stability for determining whether to capture multiple images of the scene without use of the flash or capture the image of the scene using the flash.

10. The method of claim 1, wherein determining whether to capture multiple images of the scene without use of the flash or capture the image of the scene using the flash is based on a weighted-sum equation, the weighted-sum equation comprising:

an assigned weighted value to two or more device data, the two or more device data comprising power consumption to:

generate the flash for the one or more image-capture devices;

adjust a shutter of the one or more image-capture devices;

adjust a lens of the one or more image-capture devices; or generate the post-computational image, wherein determining whether to capture multiple images of the scene without use of the flash or capture the image of the scene using the flash is responsive to a sum of weighted values exceeding a threshold.

11. The method of claim 1, wherein determining whether to capture multiple images of the scene without use of the flash or capture the image of the scene using the flash comprises using the received sensor data as an input to a machine-learning model and receiving a decision output from the machine-learning model that selects between (1) capturing multiple images of the scene without use of the flash or (2) capturing the image of the scene using the flash.

12. The method of claim 11, wherein the machine-learning model has been trained using sensor data comprising ambient conditions, low-light conditions, and a human-selected preference for a non-flash captured image or a flash-captured image.

13. The method of claim 11, wherein the machine-learning model is a convolutional neural network, the convolutional neural network having a first convolutional layer identifying geometric shape classifications by pixel values of a prior-captured image.

14. The method of claim 13, wherein the convolutional neural network comprises a second convolutional layer, the second convolutional layer being configured to determine scene elements based on the geometric shape classifications within the first convolutional layer.

15. The method of claim 1, wherein the sensor data further comprises non-imaging data collected from a gyroscope, the data collected from the gyroscope indicating whether the image-capture device maintains stability for determining whether to capture multiple images of the scene without use of the flash or whether to capture the image of the scene using the flash.

16. The method of claim 1, wherein the sensor data further comprises non-imaging data collected from a flicker sensor and determining whether to capture multiple images of the scene without use of the flash or whether to capture the image of the scene using the flash is based on the non-imaging data collected from the flicker sensor.

17. The method of claim 1, wherein the sensor data further comprises non-imaging data collected from a radar system and determining whether to capture multiple images of the scene without use of the flash or whether to capture the image of the scene using the flash is based on the non-imaging data collected from the radar system.

18. The method of claim 1, wherein capturing multiple images of the scene without use of the flash comprises capturing multiple images with at least two different exposure settings.

19. A mobile computing device comprising:

a processor; and a computer-readable storage medium having stored thereon instructions that, responsive to execution by the processor, cause the processor to:

receive, during a low-light condition for a scene, sensor data concerning ambient conditions of the scene determine, based on the received sensor data concerning the ambient conditions of the scene and using one or more image-capture devices of the mobile computing device, whether to (1) capture multiple images of the scene without use of a flash or (2) capture an image of the scene using the flash;

responsive to determining to capture the multiple images of the scene without use of the flash, generate and provide a post-computational image using the multiple images of the scene; and responsive to determining to capture the image of the scene using the flash, generate and provide a flash-captured image.

20. A non-transitory computer-readable storage medium having stored thereon instructions that, responsive to execution by a processor, cause the processor to perform operations comprising:

receiving, during a low-light condition for a scene, sensor data concerning ambient conditions of the scene;

determining, based on the received sensor data concerning the ambient conditions of the scene and using one or more image-capture devices of the mobile computing device, whether to (1) capture multiple images of the scene without use of a flash or (2) capture an image of the scene using the flash;

responsive to determining to capture the multiple images of the scene without use of the flash, generating and providing a post-computational image using the multiple images of the scene; and responsive to determining to capture the image of the scene using the flash, generate and provide a flash-captured image.

* * * * *